US008914287B2

(12) United States Patent
Mickelsen et al.

(10) Patent No.: US 8,914,287 B2
(45) Date of Patent: Dec. 16, 2014

(54) REMOTE CONTROL AUDIO LINK

(75) Inventors: Jeremy Mickelsen, Denver, CO (US);
Nathan A. Hale, Denver, CO (US);
Benjamin Mauser, Parker, CO (US);
David A. Innes, Littleton, CO (US);
Brad Bylund, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 183 days.

(21) Appl. No.: 13/016,574

(22) Filed: Jan. 28, 2011

(65) Prior Publication Data

US 2012/0173238 A1   Jul. 5, 2012

Related U.S. Application Data

(60) Provisional application No. 61/428,881, filed on Dec. 31, 2010.

(51) Int. Cl.
*G10L 15/00*   (2013.01)
*G10L 15/30*   (2013.01)
*G10L 15/22*   (2006.01)

(52) U.S. Cl.
CPC .......... *G10L 15/30* (2013.01); *G10L 2015/223* (2013.01)
USPC ............ 704/246; 704/231; 704/251; 704/252

(58) Field of Classification Search
USPC .................. 704/246, 247, 251, 252
See application file for complete search history.

(56) References Cited

U.S. PATENT DOCUMENTS

| 2001/0000534 | A1* | 4/2001 | Matulich et al. | 704/275 |
| 2002/0010579 | A1* | 1/2002 | Kitaoka et al. | 704/231 |
| 2002/0190124 | A1* | 12/2002 | Piotrowski | 235/382 |
| 2005/0114141 | A1* | 5/2005 | Grody | 704/270 |
| 2005/0272477 | A1* | 12/2005 | Boykins et al. | 455/569.1 |
| 2007/0127704 | A1* | 6/2007 | Marti et al. | 379/373.01 |
| 2008/0306740 | A1* | 12/2008 | Schuck et al. | 704/275 |
| 2009/0316054 | A1* | 12/2009 | Bailey | 348/734 |

* cited by examiner

*Primary Examiner* — Leonard Saint Cyr
(74) *Attorney, Agent, or Firm* — Kilpatrick, Townsend & Stockton LLP

(57) ABSTRACT

One embodiment may take the form of a voice control system. The system may include a first apparatus with a processing unit configured to execute a voice recognition module and one or more executable commands, and a receiver coupled to the processing unit and configured to receive a first audio file from a remote control device. The first audio file may include at least one voice command. The first apparatus may further include a communication component coupled to the processing unit and configured to receive programming content, and one or more storage media storing the voice recognition module. The voice recognition module may be configured to convert voice commands into text.

16 Claims, 3 Drawing Sheets

REMOTE CONTROL AUDIO LINK

CROSS REFERENCE TO RELATED APPLICATIONS

This application claims priority to U.S. Provisional Patent Application No. 61/428,881 titled "Remote Control Audio Link," filed Dec. 31, 2010, the entirety of which is hereby incorporated by reference herein as if fully set forth herein.

FIELD OF THE INVENTION

Embodiments described herein relate generally to devices for controlling electronic devices and, in particular, to remote control systems for controlling electronic devices.

SUMMARY

The present disclosure discloses systems and methods for voice control. In some embodiments, various voice commands may be received by a remote control device having an audio receiver. The commands may correspond to various user-input controls of a broadcast receiver or a content display device, such as controls for turning on and turning off the broadcast receiver, changing a channel, connecting to the Internet, and so on. In one embodiment, the remote control device may transmit the voice commands to a broadcast receiver or a content display device via an audio link. The broadcast receiver or the content display device may utilize a voice recognition module to convert the voice commands into text, and execute one or more executable commands in response to the voice commands. In some embodiments, the remote control device may also include a second receiver configured to receive audio signals from the broadcast receiver or the content display device, as well as a speaker configured to output the audio signals.

One embodiment may take the form of a voice control system. The system may include a first apparatus with a processing unit configured to execute a voice recognition module and one or more executable commands, and a receiver coupled to the processing unit and configured to receive a first audio file from a remote control device. The first audio file may include at least one voice command. The first apparatus may further include a communication component coupled to the processing unit and configured to receive programming content, and one or more storage media storing the voice recognition module. The voice recognition module may be configured to convert each voice command into text.

Another embodiment may take the form of a voice control system. The system may include a remote control device with a microphone configured to receive at least one voice command and a first transmitter configured to transmit at least one first audio signal to a first apparatus. Each first audio signal may include a voice command. The remote control device may further include a second transmitter configured to transmit at least one control signal to the first apparatus. Each control signal may be configured to cause the first apparatus to execute at least one executable command. The remote control device may further include a receiver configured to receive at least one second audio signal from the first apparatus.

Another embodiment may take the form of a computer program product that includes a first set of instructions, stored in at least one machine-readable medium, executable by at least one processing unit to receive at least one recorded message from a content provider configured to transmit at least one programming content signal, a second set of instructions, stored in at least one machine-readable medium, executable by at least one processing unit to process the programming content signal to obtain the recorded message, a third set of instructions, stored in at least one machine-readable medium, executable by at least one processing unit to transmit the recorded message to a remote control device if the recorded message is in the programming content signal, and a fourth set of instructions, stored in at least one machine-readable medium, executable by at least one processing unit to transmit the second signal to the remote control device if the recorded message is in a second signal separate from the programming content signal.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Many electronic devices, such as televisions, audio receivers, fans, appliances, and so on, rely on remote control devices for user input. Such remote control devices typically rely on various controls, such as small buttons and screens, for user input. The controls may be built into the remote control device or part of a touch-screen interface, but are typically very small and can be cumbersome to manipulate. An accurate and reliable voice command system that utilizes an analog audio link for transmitting voice commands from a remote control device to a broadcast receiver or other device equipped to convert the voice commands into text may greatly enhance the functionality and convenience of many electronic devices, while requiring very little additional hardware on the remote control device. Some advantages to using an analog audio link, as opposed to a digital audio link, may include the reduction or elimination of various issues sometimes associated with digital audio systems, including aliasing, quantization noise, and limitation of dynamic range. Additionally, no additional hardware is required in the remote control device for converting the voice commands into digital signals. In some embodiments, the audio link between the remote control device and the broadcast receiver may be a two-way link, so that audio signals from the broadcast receiver may be transmitted over the audio link and output by the remote control device, such as through a speaker or other audio output device.

a. System Overview

Figure 1:
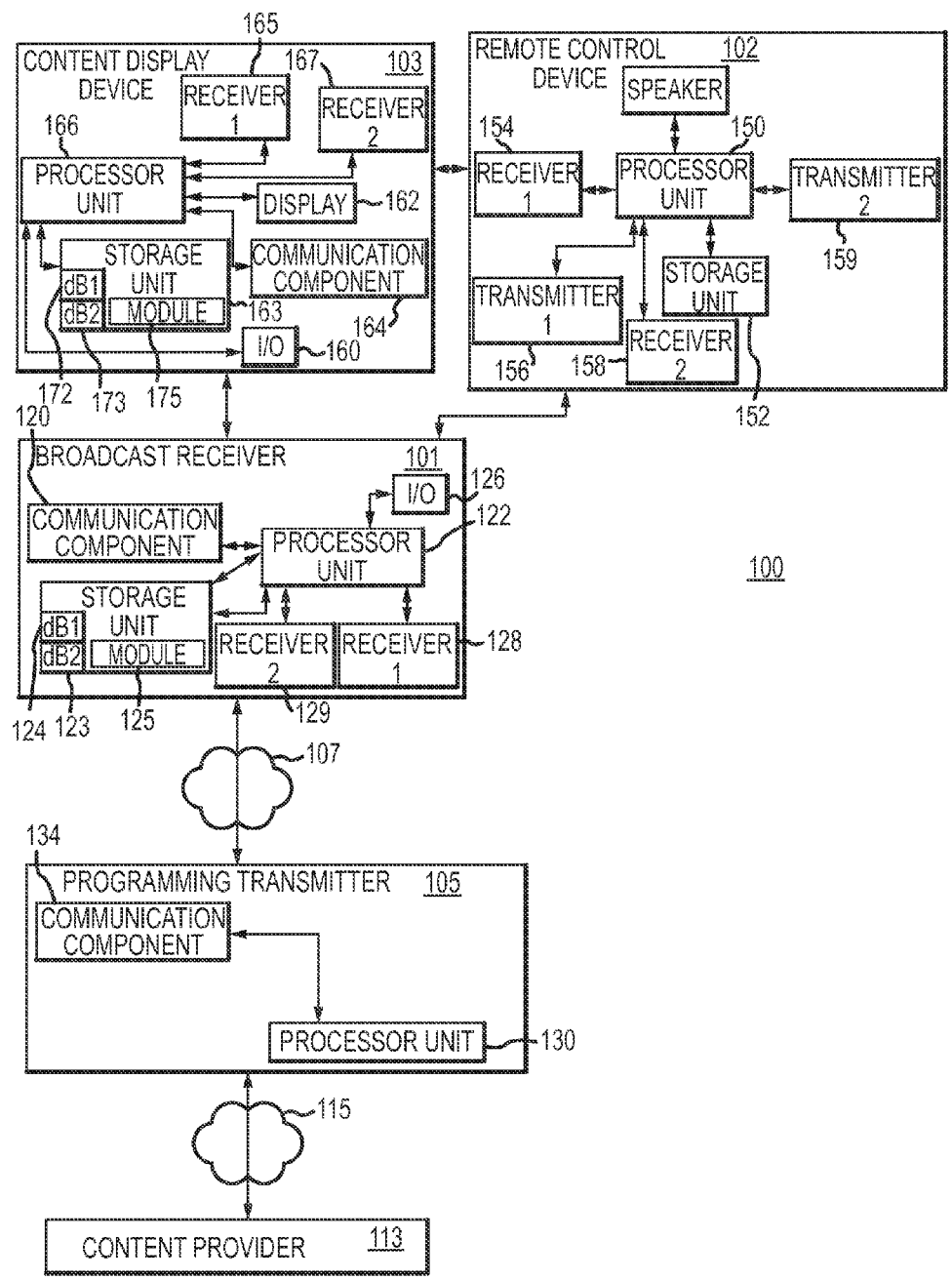
FIG. 1 is a block diagram illustrating a system for a voice control system.

FIG. 1 is a block diagram illustrating a system 100 for voice recognition and feedback. As shown in FIG. 1, the system may include a remote control device 102, a broadcast receiver 101 communicatively coupled to the remote control device 102, a first content display device 103 communicatively coupled to the broadcast receiver 101 and to the remote control device 102, and a programming transmitter 105 communicatively coupled to the broadcast receiver 101 via one or more transmission media 107. In some embodiments, a content provider 113 is communicatively coupled to the programming transmitter 105 via one or more transmission media 115. "One or more transmission media," as defined herein, may include any kind of wired or wireless transmission media such as a satellite connection, an Internet connection, a cellular connection, a local area network connection, and so on.

The remote control device 102 may include one or more processing units 150, one or more storage media 152, an audio receiver 154 configured to receive voice commands from a user, and an optional data receiver 158 configured to receive wired or wireless signals from the first content display device 103 and/or the broadcast receiver 101. In one embodiment, the first receiver 154 may be a microphone. The remote control device 102 may further include a first transmitter 156 and a second transmitter 159, each configured to transmit wired or wireless signals to the first content display device 103 and/or the broadcast receiver 101. The first transmitter 156 may be configured to transmit voice commands to the first content display device 103 and/or the broadcast receiver 101, and the second transmitter 159 may be configured to transmit command signals to the first content display device 103 and/or the broadcast receiver 101. In one embodiment, the signals transmitted by the first transmitter 156, may be analog or digital audio signals, and the signals transmitted by the second transmitter 159 may be infrared (IR) or radio frequency (RF) signals. In other embodiments, the signals may be other types of electromagnetic signals. For example, the signals may be microwave signals, radio signals, and so on and so forth. The remote control device 102 may further include an audio output device, such as a speaker 153. "Storage media," as defined herein, may be any machine-readable storage medium, such as magnetic storage (e.g., hard drives), optical storage (e.g., compact discs or digital video discs), flash memory, and the like. The storage media may also be capable of storing information for various periods of time.

The broadcast receiver 101 may include one or more processing units 122, one or more storage media 124, one or more communication components 120 configured to allow the broadcast receiver 101 to transmit and/or receive signals from the programming transmitter 105, and one or more input/output components 126 configured to allow the broadcast receiver 101 to transmit and/or receive signals from the content display device 103. Additionally, the broadcast receiver 101 may include a first receiver 128, which may be configured to receive voice commands from the remote control device 102, as well as a second receiver 129, which may be configured to receive command signals from the remote control device 102.

The content display device 103 (such as a laptop computing device, a tablet computer device, a television, a cellular telephone, and so on) may include one or more input/output components 160 to transmit and/or receive signals from the broadcast receiver 101, one or more communication components 164 to transmit and/or receive signals from the content retransmitter 109, one or more storage media 163 (which may be any machine-readable storage medium), one or more processing units 166, and one or more display devices 162. Additionally, the content display device 103 may include a first receiver 165 which may be configured to receive voice commands from the remote control device 102, as well as a second receiver 127, which may be configured to receive command signals from the remote control device 102.

The programming transmitter 105 may include one or more processing units 130 and one or more communication components 134 configured to allow the programming transmitter 105 to transmit and/or receive signals from the broadcast receiver 101 and/or the content provider 113 via one or more transmission media 107, 115. The signals may include, but are not limited to, programming content, programming information, for example, in the form of an electronic program guide, applications, audio files, images, and so and so forth.

The broadcast receiver 101 may be any kind of controllable electronic device, such as a set top box, a cable box, a television receiver, a digital video recorder, a cellular telephone, a laptop computer, a desktop computer, a mobile computer, and so on. The broadcast receiver 101 may be operable to receive programming content from one or more programming transmitters 105 via one or more transmission media 107. The processing unit 122 of the broadcast receiver 101 may store the received programming content in the storage medium, process the received programming content for display on an associated content display device 103, and so on. Additionally, the broadcast receiver 101 may further process and execute command signals received from the remote control device 102.

The programming transmitter 105, which may be one or more satellite television providers, cable television providers, Internet service providers, video on demand providers, and so on, may be operable to receive programming content from one or more content providers 113 via one or more transmission media 115 (such as one or more satellite communication links, coaxial cable transmission links, cellular communication links, Internet communication links, an so on). The processing unit 130 of the programming transmitter 105 may transmit the programming content to the broadcast receiver 101.

The content display device 103 may be any kind of device configured to process and output content received from the broadcast receiver 101. For example, the content display device 103 may be a television, a radio, a monitor, a cellular telephone, a speaker, a computer, and so on. The processing unit 166 of the content display device 103 may process and output the received programming content. Additionally, the content display device 103 may further process and execute command signals received from the remote control device 102.

The remote control device 102 may transmit command signals to one or more controllable electronic devices. The controllable electronic devices may include, but are not limited to, the broadcast receiver 101 and the first content display device 103. The remote control device may 102 also receive voice commands from a user through the first receiver 154. In some embodiments, the remote control device 102 may optionally record and store the voice commands in the storage medium 152 as audio files, as well as transmit the recorded voice commands to the broadcast receiver 101 and/or the content display device 103.

b. Voice Command Processing

The voice commands may be transmitted by the remote control device 102 through an analog audio signal or link. As alluded to above, some advantages to using an analog transmission or link, as opposed to a digital audio signal or link, may include the reduction or elimination of various issues sometimes associated with digital audio systems, including aliasing, quantization noise, and limitation of dynamic range. Additionally, no additional hardware is required in the remote control device 102 for converting the voice commands into digital signals, which may lower the manufacturing costs associated with the remote control device 102. However, in other embodiments, the voice commands may be transmitted through a digital audio signal or link. In some embodiments, the remote control device 102 may compress the audio files containing the voice commands prior to transmission to the broadcast receiver 101 and/or the content display device 103. The compressed audio signal may then be decompressed by the content display device 103 and/or the broadcast receiver upon receipt. In other embodiments, the voice commands may be transmitted in an uncompressed format.

Upon receiving the voice commands from the remote control device 102, the processing unit 122 of the broadcast receiver 101 may execute a voice or speech recognition module 125 stored in one or more storage media 124 in order to recognize the spoken commands received from the receiver 128. In one embodiment, the speech recognition module 125 may be in the form of software, hardware, or firmware that deciphers spoken words and converts the words into text. For example, the module 125 can be a data structure, such as a neural network or a decision tree, and may be based on various features of the user's speech, such as the frequency fluctuation of the user's voice, the duration of various frequencies of the user's voice, patterns in variances in frequency as the user speaks, and so on. "Module," as defined herein, can be hardware, software, firmware, or the like, operating in conjunction with or executed by a processor.

Upon converting the spoken voice commands into text, the processing unit 122 associates each voice command with one or more executable commands. The executable commands may correspond to various user-input controls of the broadcast receiver 101 and/or any content display devices 103 connected to the broadcast receiver 101. For illustration purposes only, one example of a user-input control may be a control to turn on the broadcast receiver 101, which may correspond to a sequence of executable commands for turning on the broadcast receiver 101 and/or content display device 103. As another example, the user-input control may be a channel changing control, which may correspond to a sequence of executable commands for changing channels on the broadcast receiver 101. As a further example, the user-input control may cause the broadcast receiver 101 to establish an Internet connection. In one embodiment, the speech recognition module 125 may output a text file of interpreted voice commands and associate the text file with one or more corresponding executable commands. The text files and the corresponding executable commands may be stored as one or more relational databases 123 in the storage media 124. For example, the relational databases 123 may take the form of one or more look-up tables.

Upon receiving a voice command from the remote control device 102, the processing unit 122 may execute the speech recognition module 125 in order to derive executable commands that can be executed by the processing unit 122 of the broadcast receiver 101. Additionally, the broadcast receiver 101 may further transmit the executable commands to a connected content display device 103, which may, in turn, execute the received executable commands.

In another embodiment, speech recognition may be performed by an external server or device, rather than by the broadcast receiver 101. For example, the remote control device 102 may transmit the voice commands over the Internet to a speech recognition server configured to process the voice commands and convert them into text. Alternatively, the broadcast receiver 101, after receiving the voice commands from the remote control device 102 over the audio link, may transmit the voice commands over the Internet to the speech recognition server. The speech recognition server may then transmit the text to the broadcast receiver 101, which may associate the voice commands with one or more executable commands.

The content display device 103 may be also be configured to independently accept and process voice commands from users. For example, the content display device 103 may receive the voice commands from the remote control device 102. Additionally, the processing unit 166 of the content display device 103 may execute a voice recognition module 175 stored in the storage media 163 in order to convert the spoken commands received from the remote control device 102 into text. The speech recognition module 175 may be substantially similar or identical to that described above with respect to the broadcast receiver 101. The processing unit 166 of the content display device 103 may further be configured to associate the interpreted voice commands, which may be in text format, with one or more executable commands, and store the interpreted voice commands and executable commands in one or more relational databases 172, 173 in the storage media 163. As alluded to above, the executable commands may correspond to various user-input controls of the content display device 103, such as turning on and turning off the content display device 103, volume and/or channel changing functions, and so on.

In one embodiment, the processing unit 122 of the broadcast receiver 101 may be configured to execute the voice recognition module 125 in order to allow a user to change channels using voice commands. The user may speak the voice command corresponding to the channel changing function, which may be transmitted to the broadcast receiver 101. The processing unit 122 may then access the voice recognition module 125 in the storage unit 124 to convert the received voice command into text. Once converted, the processing unit 122 may access one or more databases 123 storing one or more interpreted voice commands and corresponding executable commands to determine if there is a match between the text and an interpreted voice command in a database 123. The processing unit 122 may then execute the executable commands corresponding to the matching interpreted voice command to change the channel. In other embodiments, the processing unit 122 of the broadcast receiver 101 may be similarly configured to process voice commands for changing the volume of the programming content being watched by a user. For example, a user may speak the voice command corresponding to the volume changing function, and the processing unit 122 may execute the voice recognition module 125 to convert the voice command into text. The processing unit 122 may further access a database 123 in the storage unit 124 to look up the interpreted voice command matching the text and execute the associated executable commands.

The processing unit of the content display device 103 may be similarly configured to receive and process voice commands corresponding to volume and channel changing functions. In one embodiment, the user may issue a spoken voice command. The processing unit 166 may then access the voice recognition module 175 in the storage media 163 to convert the received voice command into text. Once converted, the processing unit 166 may access one or more databases 172, 173 storing one or more interpreted voice commands and corresponding executable commands to determine if there is a match between the text and one or the interpreted voice commands in a database 172, 173. If there is a match, the content display device 103 may execute the executable commands.

In another embodiment, the processing unit 122 or the broadcast receiver 101 may be configured to display programming content based on voice commands spoken by a user. For example, the user may state the title of a program and the processing unit 122 may execute the voice recognition module 125 to convert the spoken voice command into text. The processing unit 122 may then access the database 123 storing the interpreted voice commands and corresponding executable commands. In this embodiment, the corresponding executable commands may cause the communication component 120 of the broadcast receiver 101 to receive the named program. Similarly, the user may state a category of programming, such as "sports programming," causing the broadcast receiver 101 to receive programming information regarding sports-related programming content either currently being broadcast or scheduled for broadcast at a future time. In one embodiment, the processing unit 122 may access the programming information from an electronic program guide received from the programming transmitter 105 and/or associated metadata. In another embodiment, the programming information may be obtained from the programming content itself. The processing unit 122 may then transmit a signal to the content display device 103 to display text or graphics listing the available sports programming, or alternatively, may display a grid displaying all of the sports programming channels as currently being broadcast.

The processing unit 122 of the broadcast receiver 101 may similarly be configured to allow a user to navigate websites on the Internet using voice commands. For example, the user may name a particular website by stating the domain name or a nickname for the website, causing the communication component 120 of the broadcast receiver 101 to access the URL corresponding to the website.

c. Remote Control as Output Device

In another embodiment, the processing unit 122 of the broadcast receiver 101 may transmit audio signals to the remote control device 102. As alluded to above, the audio signals may be received by the optional second receiver 158 of the remote control device 102. The remote control device 102 may output the audio signals through a speaker 153. Similarly, the processing unit 166 of the content display device 103 may transmit audio signals to the remote control device 102, and the remote control device 102 may output the audio signals received from the content display device 103.

In one embodiment, the audio signals transmitted to the remote control device 102 by the broadcast receiver 101 and/or content display device 103 may originate from the programming transmitter 105 and/or the content provider 113. For example, the audio signal may be the audio stream of the programming content being broadcast by the broadcast receiver 101 and/or content display device 103. In other embodiments, the audio signal may not be part of the programming content, but may be a separate analog audio signal. In some embodiments, the audio signal may be output by the audio output device of the remote control device 102 as it is received from the broadcast receiver 101 and/or content display device 103. Alternatively, the processing device of the remote control device 102 may store the audio signal in its local storage media 152 and output the audio signal at a later time.

In one embodiment, the audio signal may be a recorded warning regarding a local or a national weather or other emergency. In this embodiment, the audio signal may be encoded into the audio stream of the programming content using a protocol, such as, but not limited to, the Specific Area Message Encoding or the Common Alerting Protocols, in which the recorded warning may be preceded and/or followed by identifying digital or analog codes at the beginning and/or end of the recorded warning. In one embodiment, the recorded warning may be transmitted from the broadcast receiver 101 and/or content provider 113 to the remote control device 102 and output by the speaker 153 of the remote control device 102.

In another embodiment, the remote control device 102 may be used in conjunction with a voice chat program, such as a Voice over Internet Protocol that allows users to make voice calls over the Internet. In this embodiment, the remote control device 102 may receive a message spoken by a first user through its audio receiver 154 and transmit the message to the broadcast receiver 101, which may be connected to the Internet. The broadcast receiver 101 may then transmit the message over the Internet to another user. Similarly, a message from another user may be transmitted over the Internet to the broadcast receiver 101, which may transmit the message to the remote control device 102. The remote control device 102 may then output the message through its speaker 153.

In a further embodiment, the remote control device 102 may output an audio confirmation of any voice commands received from the user through its speaker 153. The user may speak the voice command, which may be transmitted to the broadcast receiver 101. The processing unit 122 of the broadcast receiver 101 may then access the voice recognition module 125 in the storage unit 124 to convert the received voice command into text. Once converted, the processing unit 122 may access one or more databases storing one or more interpreted voice commands and corresponding audio files associated with the voice commands. If there is a match between the text and one or the interpreted voice commands in a database, the broadcast receiver 101 may access the audio file associated with the matching interpreted voice command and transmit the audio file to the remote control device 102, which may output the audio file. In other embodiments, the database storing the interpreted voice commands and corresponding audio files may be stored on the remote control device 102, rather than on the broadcast receiver 101, such that the broadcast receiver 101 may transmit the text of the voice command to the remote control device 102, which may then access the database to output the audio file associated with the text.

In other embodiments, the audio signals output by the remote control device 102 may be used to enhance programming content broadcast by the broadcast receiver 101. The audio signals of the programming content may include multiple source channels, with some of the source channels being output by the content display device 103 and/or any speakers connected to the content display device 103, and one of the source channels being output by the remote control device 102. The programming content may include, but is not limited to, movies, applications, games, music, and so on. In other embodiments, the remote control device 102 may similarly be used to enhance content from a player device connected to the content display device 103, such as a Digital Video Disc player, Compact Disc player, Blu-Ray player, gaming device, and so on.

Figure 2:
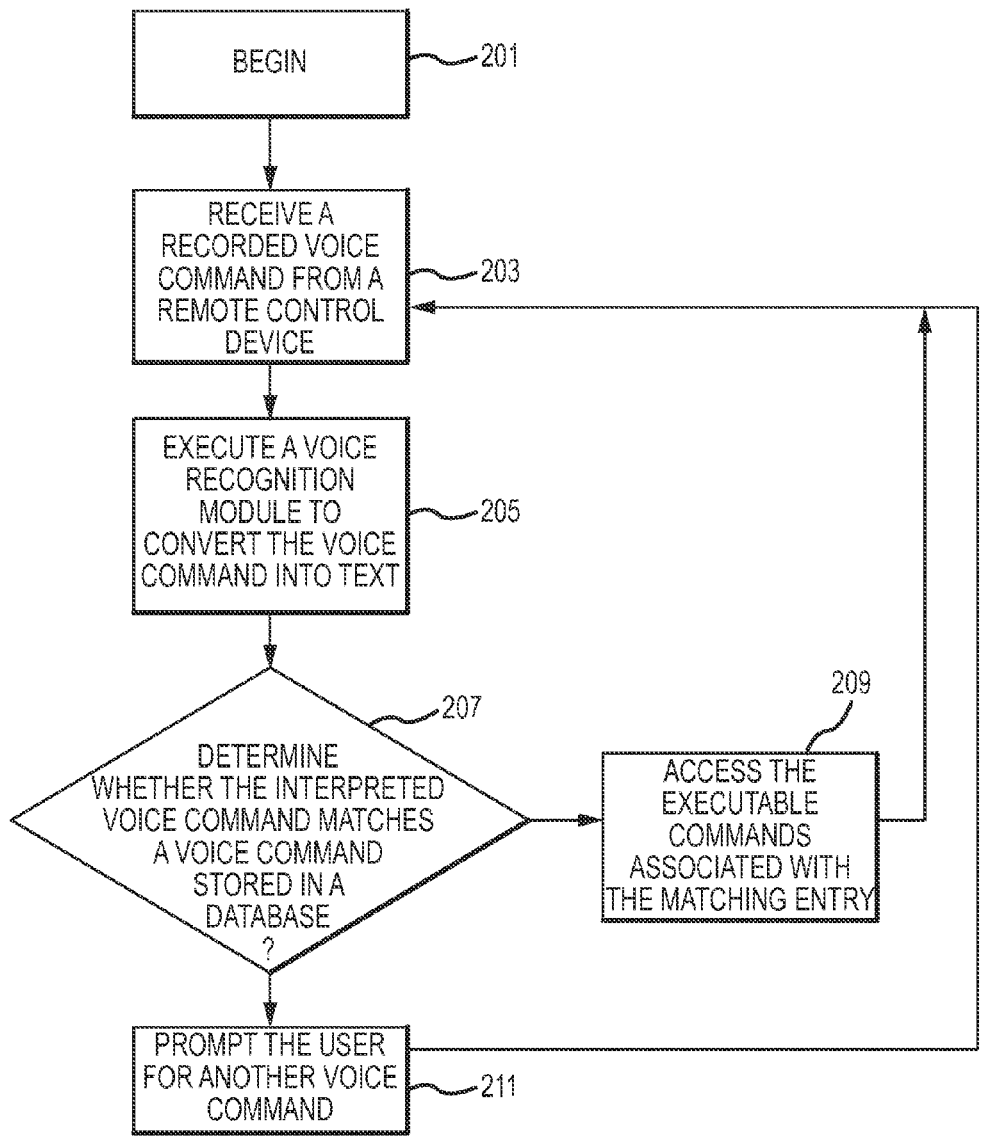
FIG. 2 is a flow chart illustrating one embodiment of a method for controlling an electronic device using a voice command. This method may be performed by the system of FIG. 1.

FIG. 2 illustrates one embodiment of a method 200 for controlling an electronic device using a voice command. The method 200 may be performed by the broadcast receiver 101 or the content display device 103 of FIG. 1. The flow begins at block 201 and proceeds to block 203, where the broadcast receiver 101 or the content display device 103 receives a voice command from a remote control device 102. The remote control device 102 may include an audio receiver, such as a microphone. The flow then proceeds to block 205, where the broadcast receiver 101 or the content display device 103 may execute a voice recognition module to convert the voice command into text. As discussed above, the module may be stored in a local storage device and accessed by the processing unit of either the broadcast receiver 101 or the content display device 103. The flow then proceeds to block 207, in which the broadcast receiver 101 or the content display device 103 may determine whether the interpreted voice command matches a voice command stored in a database. As discussed above, the database may be stored in the local storage device of either the broadcast receiver 101 or content display device 103. In one embodiment, the database may be a relational database that links one or more text files corresponding to the interpreted voice commands to one or more executable commands. If, in block 207, the broadcast receiver 101 or the content display device 103 determines that the text derived from the voice recognition module matches the text of an entry in the database then, in block 209, the broadcast receiver 101 or the content display device 103 may access the executable commands associated with the matching entry. The flow may then revert to block 203, in which the broadcast receiver 101 or the content display device 103 may receive another spoken voice command. If, however, in block 207, the broadcast receiver 101 or the content display device 103 does not match the text of an entry in the database, then the flow proceeds to block 211, in which the broadcast receiver 101 or the content display device 103 may prompt the user for another voice command. For example, this may be accomplished by outputting an audio signal or displaying text to the user on the content display device 103. In other embodiments, the content display device 103 and/or broadcast receiver 101 may transmit an audio signal to the remote control device 102, which may output the audio signal via a speaker or other audio output device. The flow may then revert to block 203, in which the broadcast receiver 101 or the content display device 103 may receive another spoken voice command.

Figure 3:
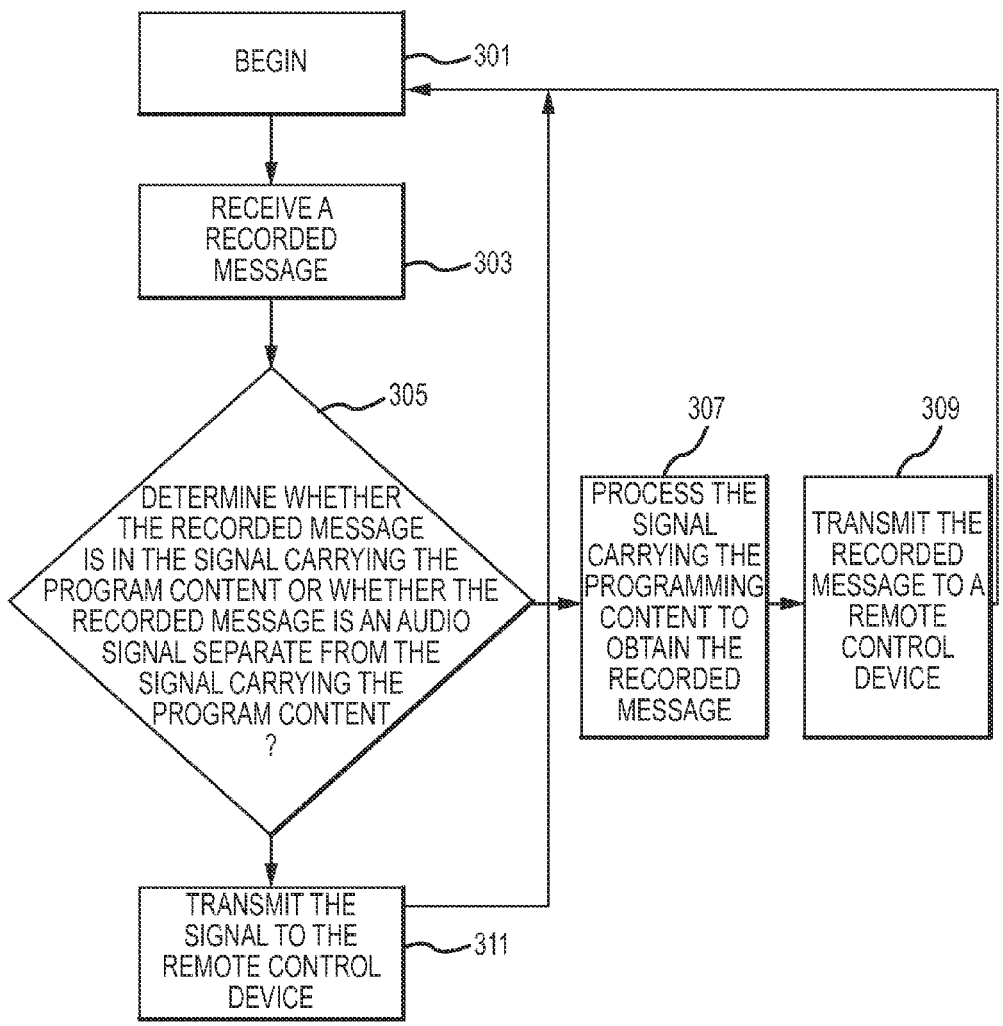
FIG. 3 is a flow chart illustrating one embodiment of a method for broadcasting a recorded message. This method may be performed by the system of FIG. 1.

FIG. 3 illustrates one embodiment of a method 300 for broadcasting a recorded message. The method 300 may be performed by the broadcast receiver 101 or the content display device 103 of FIG. 1. The flow begins at block 301 and proceeds to block 303, where the broadcast receiver 101 or the content display device 103 may receive a recorded message. As discussed above, the recorded message may be transmitted to the broadcast receiver 101 or the content display device 103 from the programming transmitter 105 and/or the content provider 113. The flow then proceeds to block 305, where the broadcast receiver 101 or the content display device 103 may determine whether the recorded message is in the signal carrying the program content or whether the recorded message is an audio signal separate from the signal carrying the program content. If, in block 305, the broadcast receiver 101 or the content display device 103 determines that the recorded message is in the signal carrying the programming content, then, in the operation of block 307, the broadcast receiver 101 or the content display device 103 may process the signal carrying the programming content to obtain the recorded message. As discussed above this may entail detecting a header code that is inserted into the programming content signal. In the operation of block 309, the broadcast receiver 101 or the content display device 103 may transmit the recorded message to a remote control device, which may output the recorded message through a speaker. The flow then reverts to block 303, in which the content display device 103 or the broadcast receiver 101 may receive another recorded message.

If, in the operation of block 305, the broadcast receiver 101 or the content display device 103 determines that the recorded message is in a signal separate from the programming content signal, then, in the operation of block 311, the broadcast receiver or the content display device 103 may transmit the signal to the remote control device 102, which may output the recorded message. The flow may then revert to block 303, in which the content display device 103 or the broadcast receiver 101 may receiver another recorded message.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A voice control system, the system comprising:
a television receiver, comprising:
a processing unit configured to execute a voice recognition module and one or more executable commands;
a receiver coupled to the processing unit and configured to receive a first audio file from a remote control device, the first audio file comprising at least one voice command;

a communication component coupled to the processing unit and configured to receive programming content; and one or more storage media storing the voice recognition module, the voice recognition module being configured to determine if the at least one voice command is from the signal carrying the programming content or whether the at least one voice command is from an audio signal separate from the signal carrying the programming content, and in response to the audio signal separate from the signal carrying the programming content convert the at least one voice command into text.

2. The system of claim 1, wherein the processing unit is further configured to determine whether the text matches one or more voice command entries in a database stored in the one or more storage media, the one or more voice command entries each including a text file and one or more executable commands associated with the text file.

3. The system of claim 1, wherein, if the text does not match one or more voice command entries in the database, the processing unit is configured to prompt the user for another voice command.

4. The system of claim 1, further comprising a remote control device comprising a microphone configured to receive voice commands.

5. The system of claim 4, wherein the remote control device further comprises a receiver configured to receive audio signals from the television receiver and an audio output device configured to output the audio signals.

6. The system of claim 4, wherein the remote control device is configured to transmit the first audio file to the television receiver in an analog signal.

7. The system of claim 4, wherein the television receiver is configured to transmit the programming content to a content display device.

8. The system of claim 4, wherein the television receiver is configured to display the programming content.

9. The system of claim 1, wherein the one or more executable commands causes the television receiver to connect to the Internet.

10. The system of claim 1, wherein the one or more executable commands causes the communication component to change channels.

11. The system of claim 1, wherein the receiver is further configured to receive a second audio file from the remote control device and transmit the second audio file to a second apparatus communicatively coupled to the television receiver.

12. A voice control system, the system comprising:
a remote control device comprising:
a microphone configured to receive at least one voice command;
a first transmitter configured to transmit at least one first audio signal to a television receiver, the at least one first audio signal comprising the at least one voice command;
a second transmitter configured to transmit at least one control signal to the television receiver, the at least one control signal configured to cause the television receiver to determine if the at least one voice command is from a signal carrying programming content or whether the at least one voice command is from an audio signal separate from the signal carrying the programming content, and in response to the audio signal separate from the signal carrying the programming content execute at least one executable command; and
a receiver configured to receive at least one second audio signal from the television receiver, the at least one second audio signal carrying a message originating from a signal received by the television receiver from a particular satellite content provider; and
a speaker configured to output the message originating from the signal received by the television receiver from the particular satellite content provider.

13. The voice control system of claim 12, wherein the remote control device comprises at least one storage medium configured to store the at least one voice command.

14. The voice control system of claim 12, wherein the television receiver is configured to convert the at least one voice command into text.

15. The voice control system of claim 12, wherein the television receiver is configured to receive at least one programming content signal and process the at least one programming signal to obtain the at least one second audio signal.

16. The voice command system of claim 12, wherein the at least one first audio signal is an analog signal.

* * * * *